H. J. RICHARDS.
THERMOMETER HOLDER.
APPLICATION FILED JAN. 10, 1920.
1,339,288.  Patented May 4, 1920.
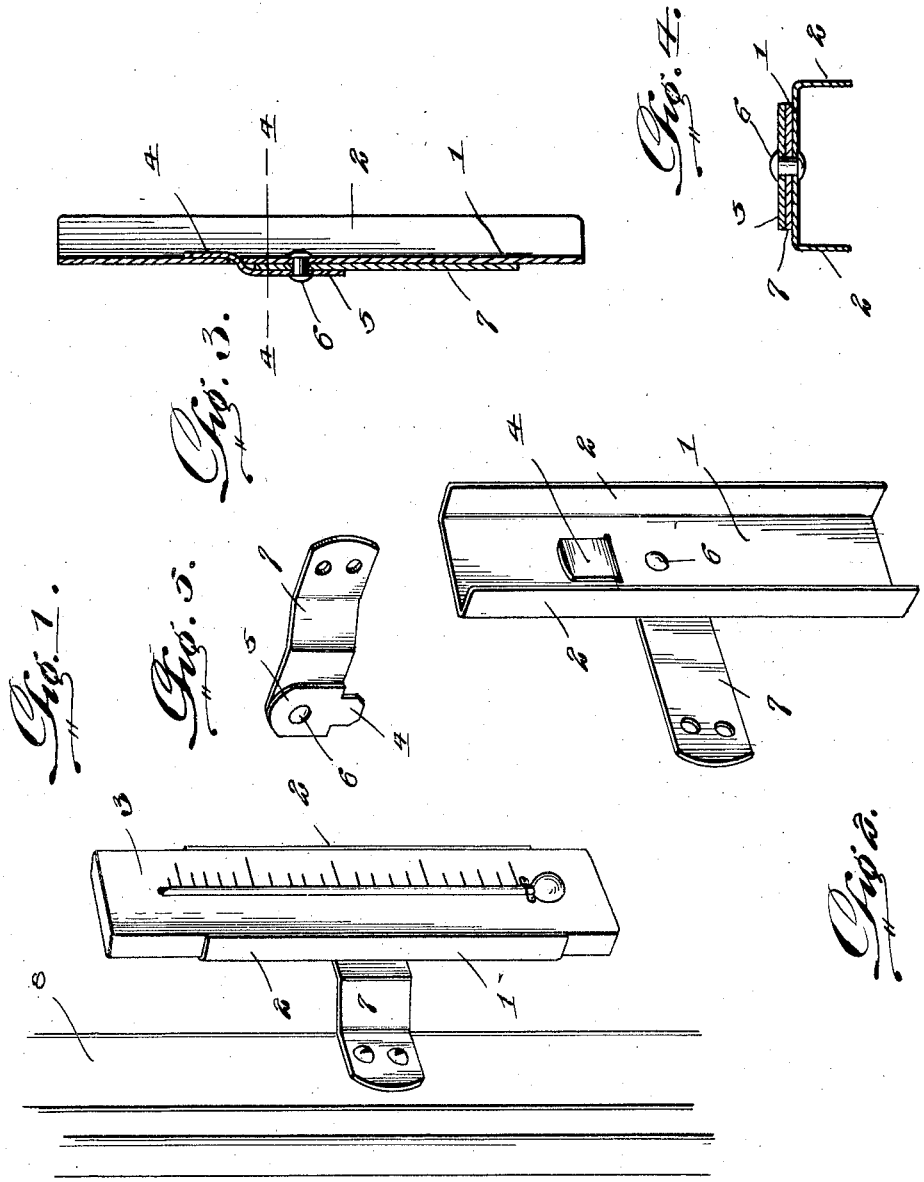
WITNESS:
INVENTOR.
BY H. J. Richards.
ATTORNEY.

UNITED STATES PATENT OFFICE.

HORACE J. RICHARDS, OF WATERVLIET, NEW YORK.

THERMOMETER-HOLDER.

1,339,288.  Specification of Letters Patent.  Patented May 4, 1920.

Application filed January 10, 1920. Serial No. 350,667.

*To all whom it may concern:*

Be it known that I, HORACE J. RICHARDS, a citizen of the United States, residing at Watervliet, in the county of Albany, and State of New York, have invented new and useful Improvements in Thermometer-Holders, of which the following is a specification.

This invention has reference to a thermometer support.

An object is to produce a support for thermometers which is designed to be attached to a window casing, and includes a holder having spring means associated therewith for removably sustaining the thermometer therein, and a bracket which is pivotally secured to the holder and which is secured to the window casing whereby the holder may be swung to any desired angle with respect to the bracket and with respect to the casing and so that a proper reading of the thermometer may be secured, and also so that the thermometer is free from contact with the casing so that the air may circulate therearound and as a consequence the mercury in the thermometer will not be affected by such contact, as is usually the case.

A further object of the invention is to produce a holder for thermometers including a supporting member for the thermometer and a pivoted bracket that is secured to the window casing, the said bracket being of a bendable nature whereby the same may be bent and shaped to arrange the support at a desired distance from and at an angle with respect to the casing.

The foregoing objects and others which will appear as the nature of the invention is better understood may be accomplished by a simple construction, combination and operative arrangement of parts such as is disclosed by the drawings.

In the drawings:—

Figure 1 is a perspective view illustrating the application of the improvement.

Fig. 2 is a similar view of the improvement detachably arranged at a right-angle on its supporting bracket.

Fig 3 is an approximately central longitudinal sectional view through the support, the latter being folded in a line with the bracket.

Fig. 4 is a transverse sectional view approximately on the line 4—4 of Fig. 3.

Fig. 5 is a perspective view of the tongue and bendable bracket plate to which it is pivoted.

In the drawings the numeral 1 designates a channeled member which has its side flanges 2 inclined toward each other. These flanges engage with the case of a thermometer 3.

The support 1, at a point beyond the center thereof has a transverse slot through which passes a curved tongue 4 that is formed on one end of a plate 5. The plate 5 is pivoted to the rear of the support 1 as indicated by the numeral 6. The pivot 6 also passes through the opening in one end of a bendable bracket plate 7. The bracket plate has openings in its outer end for the reception of securing means, and the said bracket being of a bendable nature permits of the thermometer being arranged and supported a desirable distance outward from a window casing 8, the bracket 7 being secured to the said casing.

By pivotally securing the support to the bracket the thermometer may be swung at any desired angle thereon for the free reading of the degree marks on the said thermometer.

The bracket spaces the thermometer a suitable distance away from the casing or other device to which it is attached so that the mercury in the thermometer will not be affected by contact with such supports.

In some instances it may be found desirable to dispense with the channeled member 1. In this case the tongue 4 of the plate may be inserted in a suitable opening in the thermometer casing or may be secured thereto.

Having thus described the invention, what I claim is:—

1. In a means for removably holding a thermometer, a channeled member having its flanges inclined toward each other and designed to engage with the opposite edges of a thermometer casing, a tongue carried by the support contacting the rear of the thermometer casing, and a pivoted supporting bracket secured to the back of the support.

2. In a means for removably holding a thermometer, a channeled member having inwardly inclined sides receiving therebetween a thermometer, a plate on the back of the support having a tongue passing through the support and exerting a pressure against the back of the thermometer, a pivot passing through said plate and support, and a bracket of bendable material between the plate and the support and connected thereto by the referred to pivot.

In testimony whereof I affix my signature.

HORACE J. RICHARDS.